Patented Sept. 6, 1938

2,129,631

UNITED STATES PATENT OFFICE 2,129,631

HYDROGENATION OF PHENYL PRIMARY AMINES

Charles F. Winans, Akron, Ohio, assignor to Wingfoot Corporation, Wilmington, Del., a corporation of Delaware No Drawing. Application April 21, 1937, Serial No. 138,165

6 Claims. (Cl. 260—583)

This invention relates to the hydrogenation of phenyl primary amines, such as aniline, toluidine, etc. More particularly, it is directed to improvements in the hydrogenation of such amines, whereby the character of the products obtained is controlled.

The catalytic hydrogenation of phenyl primary amines normally yields as products two saturated amines (the primary and secondary amines). As illustrated in the case of aniline, both cyclohexyl amine and dicyclohexyl amine are ordinarily obtained in substantial proportions. For many purposes cyclohexyl amine is the more desirable compound to produce. It therefore sometimes becomes advantageous to control the reaction in such a manner that the yield of cyclohexylamine is increased. This can be done to some degree by selection of the catalyst. For example, a somewhat higher yield of cyclohexyl amine is obtained when cobalt is the catalyst than when nickel is used. Furthermore, a higher yield of cyclohexylamine is obtained by carrying out the reaction at lower temperatures. Neither of these expedients, however, is entirely satisfactory. In many instances it may be desirable to use nickel as a catalyst since it is readily available and easily handled, and when lower temperatures are used in the process the time of reaction is lengthened with consequent economic disadvantages.

It has now been discovered that the yield of alicyclic primary amine can be much increased by adding to the phenyl primary amine, at the start of the reaction, a quantity of dialicyclic amine. This addition substantially increases the ratio of primary alicyclic amine to dialicyclic amine whatever catalyst and temperature are used. Thus the invention may be utilized in conjunction with catalysts or temperatures which might be otherwise disadvantageous or it may be used in conjunction with more favorable catalysts and temperatures to increase their effectiveness.

The following examples will serve to illustrate the practice of the invention.

Example 1

A mixture of 410 grams of aniline, 12 grams of cobalt oxide prepared by calcining cobalt oxalate in air at 400° C., and 15 grams of pure powdered calcium oxide was charged into a steel autoclave and was heated from room temperature under a pressure of about 110 atmospheres of hydrogen to a temperature of 225° C. when the mixture was agitated by shaking to suspend the catalyst material in the aniline. Absorption of hydrogen started at once and proceeded with great vigor, the temperature rising from 225° C. to 280° C. in 2 minutes due to the heat of reaction. After 17 minutes at 225-280° C. the absorption of hydrogen had nearly stopped and the reaction was shut down. The cooled reaction mixture was filtered and distilled, the following main fractions being collected:

1. 120–140° C. (principally 130–135°), 263 grams (cyclohexylamine).
2. 165–190° C. (principally 180–185°), 19 grams (aniline).
3. Above 190°, 113 grams (dicyclohexylamine).

When these amounts of products were corrected for slight mechanical losses, the amounts expressed as percentages of the original aniline were:

| | Per cent |
|---|---|
| Cyclohexylamine | 64.5 |
| Aniline | 5.0 |
| Dicyclohexylamine | 30.5 |

The ratio of primary amine to secondary amine was 2.1 to 1.

Example 2

A mixture of 300 grams of aniline, 100 grams of dicyclohexylamine, 15 grams of cobalt oxide prepared by calcining cobalt oxalate in air at 400° C., and 20 grams of pure powdered calcium oxide was heated in a steel autoclave to 240° C. under an initial pressure of about 100 atmospheres of hydrogen. At 240° C. agitation was started. Hydrogen was immediately absorbed with great avidity, causing the temperature to rise to 315° from the heat of reaction. After 10 minutes the run was stopped. Distillation of the cooled and filtered reaction product gave the following fractions:

1. 120–140° C. (principally 130–135°), 251 grams (cyclohexylamine).
2. 165–200° C. (principally 180–185°), 6 grams (aniline).
3. Above 200°, 156 grams (dicyclohexylamine).

Fraction 3 included the 100 grams of dicyclohexylamine originally added. When these amounts of products were corrected for mechanical losses the yields expressed in percentages of the original aniline were:

| | Per cent |
|---|---|
| Cyclohexylamine | 78.8 |
| Aniline | 2.0 |
| Dicyclohexylamine | 19.2 |

The ratio of primary to secondary amine was 4.1 to 1, a substantial improvement over the ratio of 2.1 to 1 as given in Example 1. The results of these two experiments clearly demonstrate the advantage of the invention. In Example 1, aniline was hydrogenated in the conventional manner using a cobalt catalyst. In Example 2, 25% of the original aniline was replaced by dicyclohexylamine. The results show that the addition of the dicyclohexylamine to the aniline at the start made possible a much increased yield of primary amine. In Table 1, following, are given the principal data on several experiments all of which demonstrate that the addition of dicyclohexylamine substantially increases the proportion of primary amine in the product. The use of three different catalysts are reported in this study, namely, (A) cobalt oxide prepared from cobalt oxalate by calcining in air at 400° C., (B) commercial cobalt oxide and (C) Raney nickel catalyst, prepared by treatment of a nickel-aluminum alloy with aqueous alkali, as described in United States Patent No. 1,628,190 to Raney.

Example 4

A mixture of 300 grams of paratoluidine, 100 grams of dicyclohexylamine and 15 grams of Raney nickel catalyst was heated in an autoclave under 100 atmospheres of hydrogen. Agitation was started when the temperature reached 200° C. and absorption of hydrogen proceeded to roughly 40% completion in 60 minutes at 200–250° C. The reaction mixture on distillation yielded the following results: 4-methylcyclohexylamine, 115 grams; paratoluidine, 160 grams; di(methylcyclohexyl) amine, 30 grams. When these amounts of products are expressed as percentages of the original toluidine, the yields were 4-methylcyclohexylamine 36.4%, paratoluidine 53.2%, di(methyl cyclohexyl) amine 10.3%. The ratio of primary to secondary amine was 3.53 to 1, a considerable improvement over the results of Example 3.

These last two examples therefore demonstrate that the secondary alicyclic amine employed need

| Run No. | Wt. of original charge in grams | | | Conditions of reaction | | Comp. of product, percent | | | Ratio of primary to secondary amine |
|---|---|---|---|---|---|---|---|---|---|
| | Aniline | $(C_6H_{11})_2NH$ | Catalyst | Time, min. | Temp., °C. | Cyclohexylamine | Aniline | Dicyclohexylamine | |
| 1 | 410 | | 12 g. A 15 g. CaO | 17 | 225–280 | 64.5 | 5.0 | 30.5 | 2.1:1 |
| 2 | 300 | 100 | 15 g. A 20 g. CaO | 10 | 240–315 | 78.8 | 2.0 | 19.1 | 4.1:1 |
| 3 | 350 | 50 | 15 g. A 20 g. CaO | 28 | 240–283 | 63.2 | 27.4 | 10.6 | 6.0:1 |
| 4 | 400 | | 15 g. B 20 g. CaO | 30 | 235–300 | 60.6 | 29.0 | 10.3 | 5.9:1 |
| 5 | 300 | 100 | 15 g. B 20 g. CaO | 20 | 250–323 | 93.8 | 2.4 | 3.9 | 24:1 |
| 6 | 300 | 100 | 15 g. B 20 g. CaO | 25 | 250–315 | 92.5 | 3.7 | 4.0 | 23.1:1 |
| 7 | 410 | | 20 g. C | 37 | 275–285 | 58.5 | 12.9 | 28.6 | 2.04:1 |
| 8 | 300 | 100 | 20 g. C | 20 | 245–308 | 59.1 | 29.1 | 11.8 | 5.0:1 |

This table clearly illustrates the benefits of the invention and its desirability for increasing the yield of primary amine.

In all of the foregoing examples dicyclohexylamine was employed in connection with the hydrogenation of aniline, i. e., the primary phenyl amine was treated in the presence of the corresponding secondary alicyclic amine. The following two examples demonstrate that the dialicyclic amine need not be the corresponding amine.

Example 3

A mixture of 300 grams of paratoluidine (purified by distillation over nickel) and 15 grams of Raney nickel catalyst was heated in an autoclave under 100 atmospheres of hydrogen. When the temperature reached 200° C. the mixture was agitated by shaking and absorption of hydrogen proceeded slowly. After a total time of sixty minutes at 200–250° C. absorption had stopped at roughly 50% of the theoretical. On distillation, the reaction mixture yielded the following materials: 4-methyl cyclohexylamine, 75 grams; paratoluidine, 122 grams; di(methylcyclohexyl) amine, 72 grams. These amounts of products expressed as percentages of the original toluidine were 4-methyl cyclohexylamine 23.7%, paratoluidine 40.7% and di(methylcyclohexyl) amine 24.5%. The ratio of primary to secondary amine was 0.965 to 1.

not be that produced in the hydrogenation of the primary phenyl amine but that other members of the homologous series may be used with satisfactory results. Generally speaking, however, it will be desirable to use the corresponding dialicyclic amine since this makes the separation of the reaction product a simpler procedure. Using a different dialicyclic amine merely introduces an extra constituent which complicates the character of the resultant product.

Although, in the cited examples and data, only nickel and cobalt catalysts have been described, the invention is not limited thereto. These are the preferred catalysts but any other catalyst suitable for the hydrogenation of phenyl primary amines, both noble metal catalysts and other base metal catalysts in either metal or oxide form, may be similarly employed. However, the base metal catalysts, and particularly nickel and cobalt, in either metallic or oxide form, are preferred. Nor need the hydrogenation be conducted strictly according to the examples. The hydrogenation of phenyl primary amines is a well known process and the present invention is intended as an improvement of that process generally whatever the details may be. Therefore, other quantities of materials, temperatures, pressures, etc. may be employed.

Other phenyl primary amines with which the process of the invention may be utilized are o-, and m-toluidine, the xylidines, o-, m-, and p-anisidine, o-, m-, and p-phenetidine, p-amino biphenyl, etc.

Therefore it will be evident to one skilled in the art that many modifications may be made in the practice of the invention without departing from the spirit of the invention or the scope of the attached claims in which it is intended to claim all patentable novelty inherent in the invention.

I claim:

1. In the hydrogenation of aniline, the method of increasing the yield of cyclohexylamine which comprises conducting the hydrogenation from the start in the presence of dicyclohexylamine.

2. In the hydrogenation of aniline with a base metal catalyst, the method of increasing the yield of cyclohexylamine which comprises conducting the hydrogenation from the start in the presence of dicyclohexylamine.

3. In the hydrogenation of aniline with a nickel catalyst, the method of increasing the yield of cyclohexylamine which comprises conducting the hydrogenation from the start in the presence of dicyclohexylamine.

4. In the hydrogenation of aniline with a cobalt catalyst, the method of increasing the yield of cyclohexylamine which comprises conducting the hydrogenation from the start in the presence of dicyclohexylamine.

5. In the hydrogenation of aniline and its homologs, the method of increasing the yield of primary alicyclic amine which comprises conducting the hydrogenation from the start in the presence of the secondary alicyclic amine corresponding to the primary alicyclic amine.

6. In the hydrogenation of aniline and its homologs, the method of increasing the yield of primary alicyclic amine which comprises conducting the hydrogenation from the start in the presence of a secondary alicyclic amine in which the alicyclic groups are monocyclic.

CHARLES F. WINANS.